United States Patent
Osborn et al.

(10) Patent No.: US 12,143,515 B2
(45) Date of Patent: Nov. 12, 2024

(54) SYSTEMS AND METHODS FOR TRANSACTION CARD-BASED AUTHENTICATION

(71) Applicant: Capital One Services, LLC, McLean, VA (US)

(72) Inventors: Kevin Osborn, Newton Highlands, MA (US); Samuel Patrick Edwards, Richmond, VA (US); Vincent Vy Ngo, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 51 days.

(21) Appl. No.: 17/214,073

(22) Filed: Mar. 26, 2021

(65) Prior Publication Data

US 2022/0311627 A1    Sep. 29, 2022

(51) Int. Cl.
*H04L 29/06*    (2006.01)
*H04L 9/08*    (2006.01)
(Continued)

(52) U.S. Cl.
CPC .......... *H04L 9/3271* (2013.01); *H04L 9/0894* (2013.01); *H04L 9/3247* (2013.01);
(Continued)

(58) Field of Classification Search
CPC ... H04L 9/3271; H04L 9/0894; H04L 9/3247; H04L 9/3263; H04L 63/0884;
(Continued)

(56) References Cited

U.S. PATENT DOCUMENTS 4,683,553 A    7/1987 Mollier
4,827,113 A    5/1989 Rikuna
(Continued)

FOREIGN PATENT DOCUMENTS

AU    2014200248    7/2014
CA    3010336    7/2017
(Continued)

OTHER PUBLICATIONS

EPCglobal Inc., EPC™ Radio-Frequency Identity Protocols Generation-2 UHF RFID, dated Apr. 2015, pp. 1-152, downloaded from the Internet on Dec. 15, 2022 at URL: https://www.gs1.org/sites/default/files/docs/epc/Gen2_Protocol_Standard.pdf (Year: 2015).*
(Continued)

*Primary Examiner* — Harunur Rashid
(74) *Attorney, Agent, or Firm* — KDW Firm PLLC; Andrew D. Kasnevich (57) ABSTRACT

A method is provided for communicating with a transaction card having a card data processor, a near card field communication (NFC) interface, and a card memory having a unique card identifier stored therein. In this method, a user communication device establishes an NFC session with the transaction card and transmits to the transaction card an NFC data exchange format (NDEF) WRITE TAG command including session-specific challenge information. The user communication device transmits to the transaction card an NDEF READ TAG command and receives from the transaction card, card-specific challenge response information. The challenge response information is then used to authenticate the transaction card.

20 Claims, 4 Drawing Sheets

(51) Int. Cl.
   *H04L 9/32* (2006.01)
   *H04L 9/40* (2022.01)
(52) U.S. Cl.
   CPC ........ *H04L 9/3263* (2013.01); *H04L 63/0884* (2013.01); *H04L 2209/805* (2013.01)
(58) Field of Classification Search
   CPC .......... H04L 2209/805; G06Q 20/3821; G06Q 20/352; G06Q 20/40975; G06F 21/77; H04W 12/06
   See application file for complete search history.

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,592,553 | A | 1/1997 | Guski et al. |
| 5,616,901 | A | 4/1997 | Crandall |
| 5,666,415 | A | 9/1997 | Kaufman |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Mamdani et al. |
| 8,005,426 | B2 | 8/2011 | Huomo et al. |
| 8,010,405 | B1 | 8/2011 | Bortolin et al. |
| RE42,762 | E | 9/2011 | Shin |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |

(56) References Cited

U.S. PATENT DOCUMENTS

| | | |
|---|---|---|
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,831,509 B2 | 9/2014 | Moosavi et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,020,423 B2 | 4/2015 | Naniyat et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,077,769 B2 | 7/2015 | Krzeminski et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,385,789 B1 | 7/2016 | Van Bosch et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,467,203 B2 | 10/2016 | Yeh |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,031,707 B2 | 7/2018 | Hamakawa |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,749,885 B1* | 8/2020 | Hoorvitch ............... H04L 63/08 |
| 10,909,525 B1* | 2/2021 | Dhodapkar ........ G06Q 20/3278 |
| 11,361,174 B1* | 6/2022 | Robshaw .............. H04L 9/3242 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0225427 A1* | 10/2005 | Bell .................. G07C 9/28 340/5.2 |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |

(56) References Cited

U.S. PATENT DOCUMENTS

| | | |
|---|---|---|
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0123305 A1 | 5/2007 | Chen et al. |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0134044 A1* | 6/2011 | Carapelli ............... G06F 21/86 345/520 |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0077432 A1 | 3/2012 | Rose et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0220221 A1 | 8/2012 | Moosavi et al. |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0271380 A1* | 10/2012 | Roberts ............... H04L 63/068 607/60 |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0196594 A1 | 8/2013 | Moosavi |
| 2013/0196595 A1 | 8/2013 | Byrne et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0268687 A1* | 10/2013 | Schrecker ............ H04W 12/06 709/229 |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314334 A1 | 11/2013 | Leica et al. |
| 2013/0314593 A1 | 11/2013 | Reznik et al. |
| 2013/0344804 A1 | 12/2013 | Chen et al. |
| 2013/0344857 A1 | 12/2013 | Berionne et al. |
| 2014/0002238 A1 | 1/2014 | Taveau et al. |

(56) References Cited

U.S. PATENT DOCUMENTS

| | | |
|---|---|---|
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0141717 A1 | 5/2014 | Hsiao et al. |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0220888 A1 | 8/2014 | Shimshoni |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0341745 A1 | 11/2015 | Deluca |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0042207 A1 | 2/2016 | Inotay et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0105290 A1* | 4/2016 | Khalil ............... H04L 63/0815 |
| | | 713/168 |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0262336 A1* | 9/2018 | Fujiwara ............... H04L 9/321 |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0064834 A1 | 2/2019 | Adams |
| 2019/0238517 A1 | 8/2019 | D'Agostino et al. |
| 2019/0385429 A1* | 12/2019 | Pochtar ............... G08B 13/26 |
| 2020/0092087 A1 | 3/2020 | Hillan et al. |

FOREIGN PATENT DOCUMENTS

| | | |
|---|---|---|
| CN | 101192295 | 6/2008 |
| CN | 103023643 | 4/2013 |
| CN | 103417202 | 12/2013 |
| DE | 10 2005 062763 | 7/2007 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| EP | 2495883 | 5/2013 |
| EP | 2663110 | 11/2013 |
| EP | 2667641 | 11/2013 |
| GB | 2 457 221 | 8/2009 |
| GB | 2 516 861 | 2/2015 |
| GB | 2 551 907 | 1/2018 |
| JP | 2015023450 | 2/2015 |
| KR | 101362818 | 2/2014 |
| KR | 20140063987 | 5/2014 |
| KR | 101508320 | 4/2015 |

(56) References Cited

FOREIGN PATENT DOCUMENTS

| WO | WO 00/49586 | 8/2000 |
|---|---|---|
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2012037690 | 3/2012 |
| WO | 2012/140308 | 10/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | 2016/014784 | 1/2016 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

NFC Forum, Inc., NFC Data Exchange Format (NDEF), dated Jun. 2006, pp. 1-25, downloaded from the Internet on Dec. 15, 2022 at URL: http://sweet.ua.pt/andre.zuquete/Aulas/IRFID/11-12/docs/NFC%20Data%20Exchange%20Format%20(NDEF).pdf (Year: 2006).*

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-US/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug BIG SEVEN open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon. com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

(56) References Cited

OTHER PUBLICATIONS

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappaymentTM", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVco, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
International Search Report and the Written Opinion of the International Searching Authority issued in related PCT Application No. PCT/US2022/021088 mailed Jun. 29, 2022, 12 pages.

\* cited by examiner

SYSTEMS AND METHODS FOR TRANSACTION CARD-BASED AUTHENTICATION

FIELD OF THE INVENTION

The present disclosure relates generally to transaction security and, more specifically, to exemplary systems, methods, and computer-accessible mediums for using a transaction card to carry out a challenge response security protocol.

BACKGROUND OF THE INVENTION

The development of electronic commerce has led to the convenience of consumers and businesses alike. Transactions may be conducted between and among parties from virtually any location and at any time. Use of cards such as credit and debit cards has enhanced the ability to conduct transactions over networks, as consumers may engage in purchase transactions, or conduct other business, merely by providing credentials including a name, a card number, and other data such as, for example, a card expiration date, a card security code, or a billing zip code.

But the increasing use of cards has also resulted in increased risk of fraud or theft. Despite efforts to make card-based transactions more secure, smart cards and other devices may often be vulnerable to replay attacks in which card and/or transaction information is intercepted and subsequently used in a fraudulent manner to carry out additional transactions.

SUMMARY OF THE INVENTION

An illustrative aspect of the invention provides a method of communicating with a transaction card having a card data processor, a near card field communication (NFC) interface, and a card memory having a unique card identifier stored therein. The method comprises establishing, by a user communication device, a first NFC session with the transaction card and transmitting, by the user communication device to the transaction card, an NFC data exchange format (NDEF) WRITE TAG command including session-specific; challenge information. The method further comprises transmitting, by the user communication device to the transaction card, an NDEF READ TAG command and receiving, by the user communication device from the transaction cant card-specific challenge response information. The method also comprises authenticating the transaction card using the challenge response information.

Another aspect of the invention provides a user communication device comprising a communication device data processor and an NFC interface in communication with the data processor. The NFC interface is configured for communication with one or more transaction cards. The user communication device further comprises a communication device memory accessible by the data processor and containing a card communication application with instructions to be carried out by the data processor. The communication application is configured to establish a first NEC session with a transaction card, and transmit, to the transaction card, an NDEF WRITE. TAG command including session-specific challenge information. The application is further configured to transmit, to the transaction card, an NDEF READ TAG command, receive, from the transaction card, card-specific challenge response information, and authenticate the transaction card.

Another aspect of the invention provides a transaction card comprising a card microprocessor, a near field communication (NFC) interface, and a card memory having a card identifier and one or more applets stored therein. The one or more applets include instructions for the card microprocessor to receive, from a user communication device via the NFC interface, an NDEF WRITE TAG command including challenge information and generate a digital signature using the challenge information. The one or more applets include further instructions to receive, from the user communication device via the NFC interface, an NDEF READ TAG command, and transmit, to the user communication device, the digital signature.

DETAILED DESCRIPTION OF THE INVENTION

The following description of embodiments provides non-limiting representative examples referencing numerals to particularly describe features and teachings of different aspects of the invention. While the invention will be described in connection with particular embodiments and environments, it will be understood that the invention is not limited to these embodiments and environments. On the contrary, it is contemplated that various alternatives, modifications and equivalents are included within the spirit and scope of the invention as described. Further, the embodiments described should be recognized as being capable of separate implementation or of combination with other embodiments.

As used herein, the term "transaction card" refers to any identification or payment card associated with a user or user account. This may include, in particular, a credit card, debit card, or gift card, any of which may be issued by a service provider. Smart transaction cards are often used to carry out transactions through near field communication (NFC) or brief contact communication (e.g., "tapping") with transaction processing devices. Because of inherent limitations in the transaction processing device, such cards may not be suitable for use in authentication, except as part of a low-level protocol.

The present invention provides an approach that enhances the value of a smart transaction card in carrying out a multi-factor security protocol. This approach involves a challenge response protocol that makes use of a user processing device's ability to transmit NFC data exchange format (NDEF) WRITE and READ commands to the transaction card. In methods of the invention, the user may establish an NFC communication session between the transaction card and the user device (e.g., by tapping or otherwise bringing the user device within communication range of the card). The user device transmits a WRITE NDEF to the transaction card. The transaction card reads the information from the WRITE command and uses it to create a digital signature. The user device then transmits a READ NDEF command to the transaction card, whereupon the transaction card transmits the digital signature to the user device. The signature may be accompanied by a certificate signed by a trusted authority. The user device may then itself validate the card signature or may pass the signature to a validation system. In either case, validation of the signature could be used for authentication of the presence of the transaction card and/or as an authentication factor in a multi-factor authentication of the user.

Figure 1:
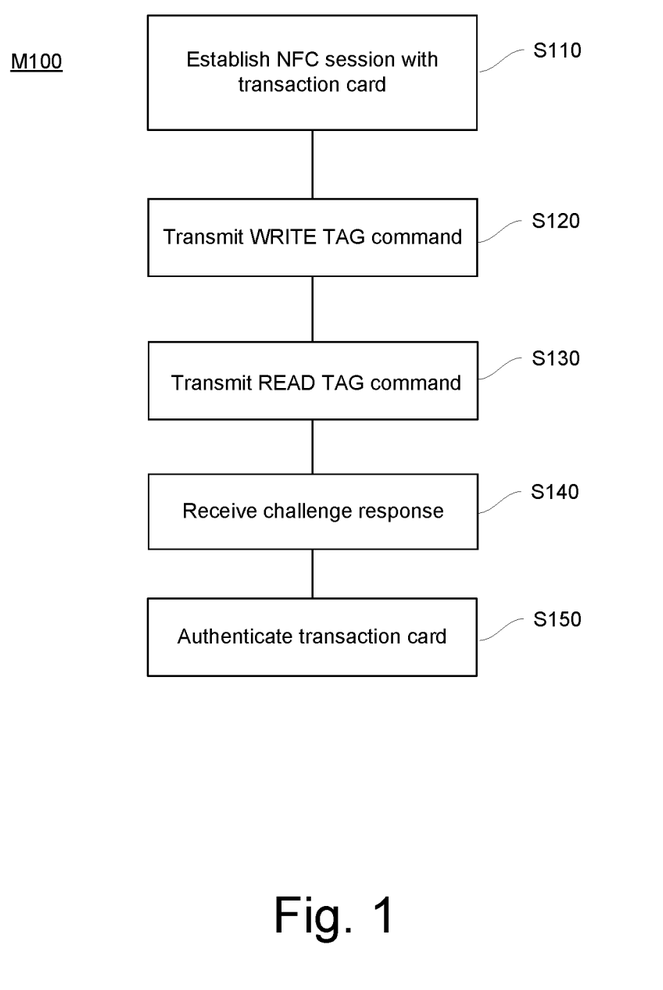
FIG. 1 is a flow chart of actions in a method of communicating with a transaction card according to an embodiment of the invention.

FIG. 1 illustrates a basic method M100 of communication between a user communication device and a transaction card. The method M100 can be used as part of a user and/or card authentication process. As will be discussed in more detail hereafter, transaction cards usable in methods of the invention may have a card data processor, a near field communication interface and a card memory. The card memory may have card-unique information stored therein, including a unique card identifier. In some embodiments, the card memory may have one or more encryption keys stored therein. The user communication device may be any data processing device having near field communication capability and will typically be a network-enabled computer system. As used herein, the term network-enabled computer system (and/or device) may include, but is not limited to, any computer device, or communications device including, a server, a microprocessor or system of microprocessors, a network appliance, a personal computer (PC), a workstation, and a mobile processing device such as a smart phone, smart pad, handheld PC, or personal digital assistant (PDA). In some examples, the computer device may use instructions stored on a computer-accessible medium (e.g., a storage device such as a hard disk, floppy disk, memory stick, CD-ROM, RAM, ROM, etc., or a collection thereof). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein. Mobile processing devices, in particular, may include NFC capabilities that allow for communication with other NFC-enabled devices by touching the devices together or bringing them into close proximity.

In some embodiments of the invention, the user communication device may be a merchant terminal or other device configured for carrying out financial and other transactions. Such merchant devise may be specifically configured for carrying out transactions based on an account associated with the transaction card and/or the transaction card administrator or processor. In other embodiments of the invention, the user communication device may be a mobile device, which may be associated with a user who is a holder of an account associated with the transaction card.

At S110 of the method M100, an NFC communication session is initiated between the user communication device and the transaction card. This will typically be accomplished by tapping the card to the user communication device or otherwise bringing the card to within NFC communication range of the user communication device. The action of initiating the NFC session may be taken as part of a purchase or other transaction that involves an account associated with the transaction card. In some embodiments, however, the action may be taken as part of an authentication or authorization protocol in conjunction with a transaction that does not otherwise involve an account associated with the transaction card. For example, a purchase may be made from a merchant using another card. The merchant may require authentication of the user/account holder using the smart transaction card, whereupon NFC communication can be established between a merchant terminal and the transaction card.

In some embodiments, the action of establishing NFC communication may be carried out in response to receiving an authentication request from a transaction processing server or authentication server. Such a request may, may be transmitted by the server in response to a request to carry out a transaction requiring verification of the presence of the transaction card or otherwise requiring authentication of the transaction card or the user. Upon receiving the authentication request, the user communication device may display or otherwise convey an instruction to initiate NFC communication with the transaction card.

In embodiments of the invention, the user communication device may include an application for transmitting standardized NDEF messages for communication with NFC-enabled devices. Such methods are used, in particular, for communication with standardized tags (e.g., Radio Frequency Identification (RFID) tags) and include "WRITE TAG" commands for assigning information to a tag and "READ TAG" commands for reading information from a tag. At S120 of the method M100, the user communication device transmits a WRITE TAG command to the transaction card. The WRITE TAG command includes challenge information for use by the transaction card in generating a challenge response. The challenge information may be or include information that is unique to the NFC session. This may include, for example, a one-time, random or pseudo-random or otherwise unpredictable number. The challenge information may be generated by the user communication device or by a requesting processing or authentication server. In some embodiments, the challenge information may be included in an authentication request received by the user communication device from a processing or authentication server. In other cases, the user communication device may transmit NFC session information to a requesting server and receive session-specific challenge information in return.

The user communication device transmits a READ TAG command to the transaction card at S130, and, at S140, receives a transmitted READ TAG response from the transaction card. In some embodiments of the invention, the READ TAG command must be sent to the transaction card within the same NFC communication session as the WRITE TAG command. In such embodiments, termination of the NFC session prior to the READ TAG command would result in termination without authentication of the transaction card. In these circumstances, card authentication would require a new NFC session and new challenge information. In other embodiments, however, the method M100 may include termination of the NFC session (e.g., by removal of the transaction card from NFC communication range) and initiation of a second NFC communication session prior to the action of transmitting the READ TAG command. In some embodiments, such termination and re-initiation of NFC communication may be an allowable occurrence while in others, it may be required.

Whether a single NFC session or multiple sessions are used, the method M100 may include a time limit for transmitting the READ TAG command. This time limit may be based on a predetermined maximum time interval between the transmitting of the WRITE TAG command and the transmitting of the READ TAG command. In embodiments where multiple NFC sessions are allowed or required, a maximum time interval between termination of the first session and initiation of the second session may be specified.

The READ TAG response includes challenge response information that is unique to the transaction card. This may include, for example, a card identifier. The challenge response information may be or include information that is generated by the transaction card's data processing chip using information that is permanently assigned and/or wired into a memory of the transaction card. In particular embodiments, the challenge response information may include information that is encrypted by the card data processing chip. The challenge response information may also include a digital authentication certificate from a trusted source. Such a certificate may be used as a public key in encrypting and decrypting the challenge response information.

At S150, the transaction card is authenticated using the challenge response information. In some embodiments, the authentication action may be carried out entirely by the user communication device. This may include comparing card-unique information to previously stored card information. Alternatively or in addition, authentication may include decrypting information encrypted by the transaction card data processor. Successful decryption would indicate a positive authentication of the transaction card. The foregoing approach may require, however, that one or more private encryption keys stored in the transaction card memory would also need to be available to the user communication device. To avoid this requirement, in some embodiments, the user communication device may transmit some or all of the challenge response information to an authentication-requesting server or directly to an authentication server having access to card-specific encryption keys. In such embodiments, the user communication device may receive back an authentication response indicating that the transaction card has been authenticated or that authentication failed.

In embodiments where authentication is carried out by the user communication device, the method M100 may further include transmitting the results of the authentication to a requesting processing server or authentication server.

Figure 2:
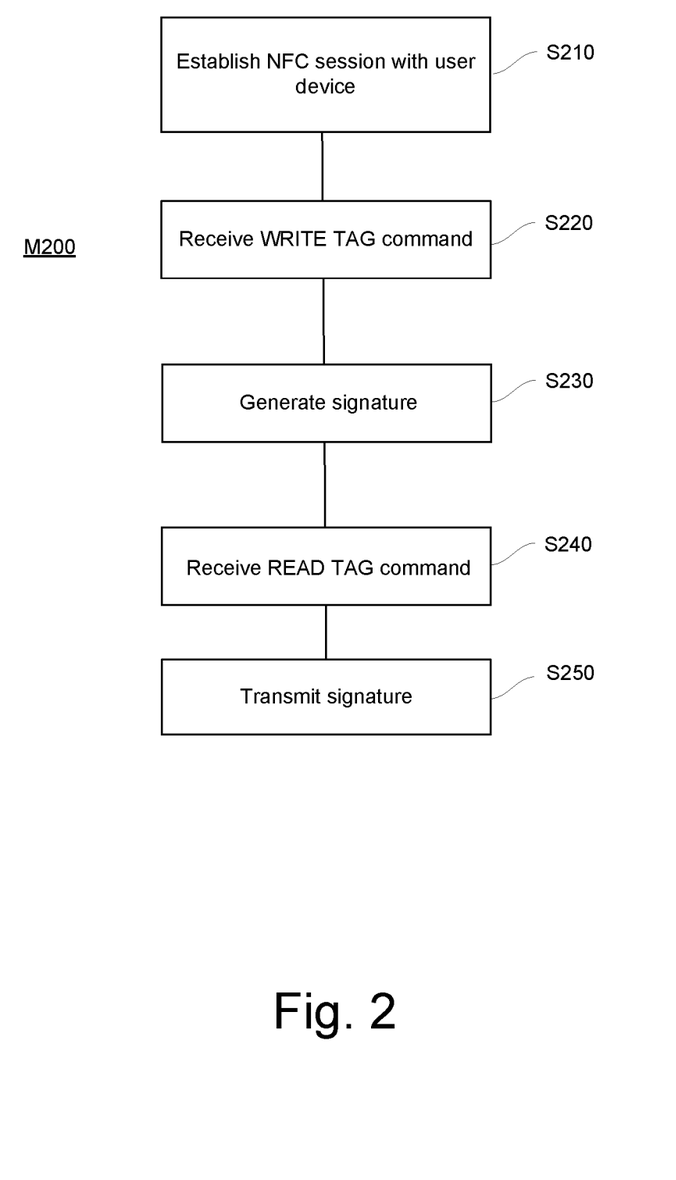
FIG. 2 is a flow chart of actions in a method of authenticating a communication between a transaction card and a user communication device according to an embodiment of the invention.

FIG. 2 illustrates a basic method M200 for a smart transaction card to authenticate communication with a user communication device according to an illustrative embodiment of the invention. A typical transaction card usable to carry out the method M200 has a card data processor, an NFC interface, and a card memory having a unique card identifier stored therein. In some embodiments, the card memory may also have one or more card-unique encryption keys stored therein. At S210, of the method M200, an NFC communication session is established between the card data processor and a user communication device. The user communication device may be, for example, a merchant transaction terminal, a mobile user device, or other network-enabled device or system. The NFC communication session may be initiated by tapping the card to the user communication device or otherwise bringing the card to within NFC communication range of the user communication device. At S220, the card data processor receives a WRITE TAG command from the user communication device via the card's NFC interface. The WRITE TAG command includes challenge information, which may be or include information that is unique to the NFC session. This may include, for example, a one-time, random or pseudo-random or otherwise unpredictable number.

At S230, the card data processor uses the challenge information to generate a challenge response. The challenge response information may be or include a card-unique and/or session-unique signature. In particular embodiments, the signature may be or include information from the challenge information that has been encrypted by the card processor using one or more card-unique encryption keys. A public key (e.g., a trusted source certificate) may also be used in the encryption. The challenge response may also include a card identifier and/or a public key used in the encryption of challenge information.

The card data processor receives a READ TAG command from the user communication device via the card NFC interface at S240 and transmits the challenge response back to the user communication device at S250.

Figure 3:
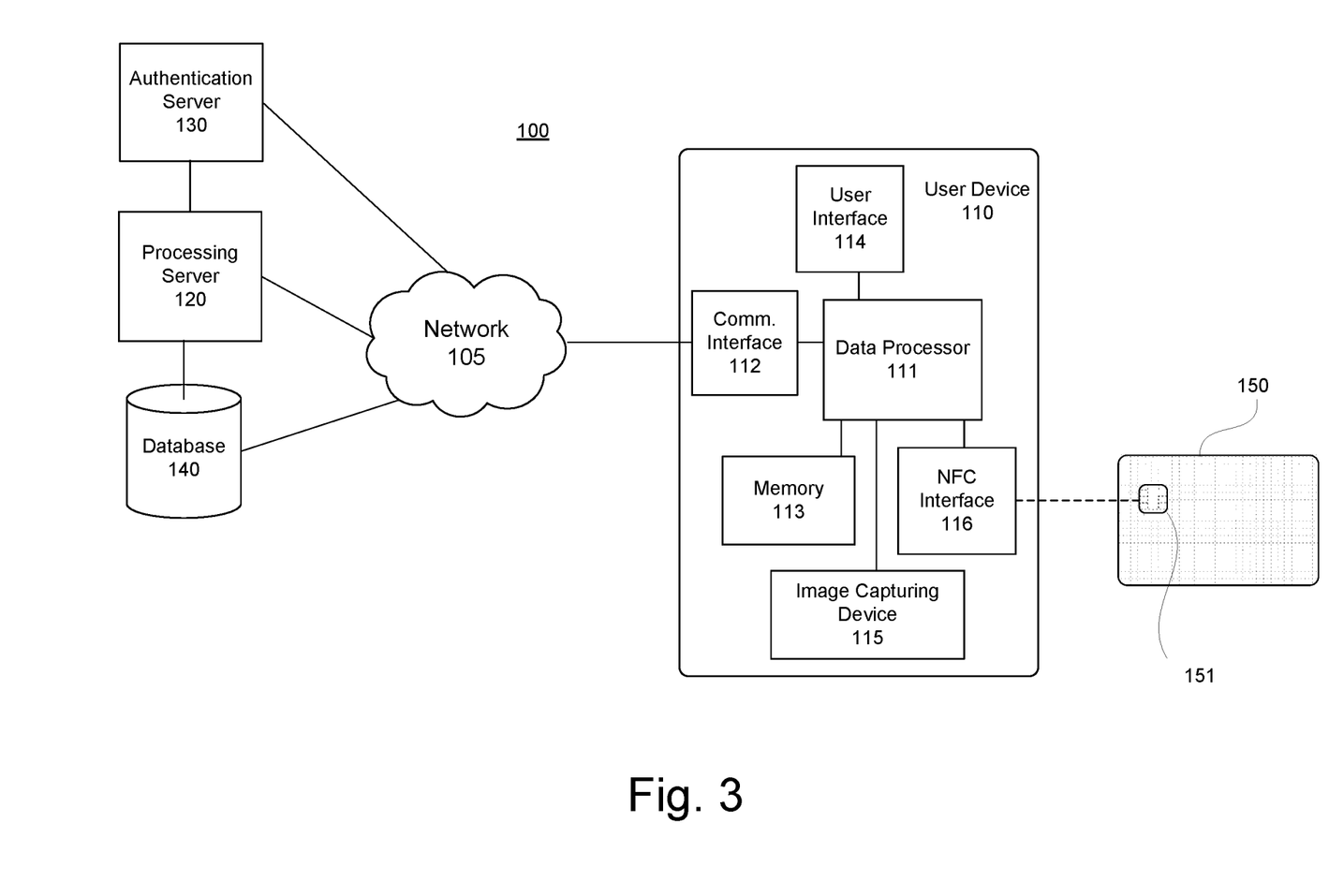
FIG. 3 is a schematic representation of a transaction card authentication system according to an embodiment of the invention.

With reference now to FIG. 3, an exemplary transaction card authentication system 100 according to an embodiment of the invention may include a user device 110, a transaction card 150, a processing server 120 and a card information database 140. The user device 110 may communicate with the processing server 120 via a network 105. The processing server 120 and/or user device 110 may also communicate with an authentication server 130. Although FIG. 3 illustrates certain components connected in certain ways, system 100 may include additional or multiple components connected in various ways. In particular, the system 100 may include multiple user devices 110 and multiple transaction cards 150.

The systems and components of the system 100 may be or include network-enabled computer devices and systems that are configured for processing account-related transactions. In particular, these systems may be configured to execute one or more software applications to, for example, receive data as input from an entity accessing the network-enabled computer system, process received data, transmit data over a network, and receive data over a network in order to process transactions originating from a merchant transaction device or an account holder's device. The various network-enabled computer systems may also include one or more software applications to transmit notifications to account holders (e.g., via the account holders' computer systems or mobile devices). It will be understood that the depiction in FIG. 3 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 3.

In the example embodiments presented herein, an account holder may be any individual or entity that desires to conduct a transaction (which may be, but is not limited to a financial transaction) with a merchant using a transaction account. An account may be held by any place, location, object, entity, or other mechanism for holding money or performing transactions in any form, including, without limitation, electronic form. An account may be associated with one or more transaction cards such as, for example, a credit or debit card or a prepaid card.

Figure 4:
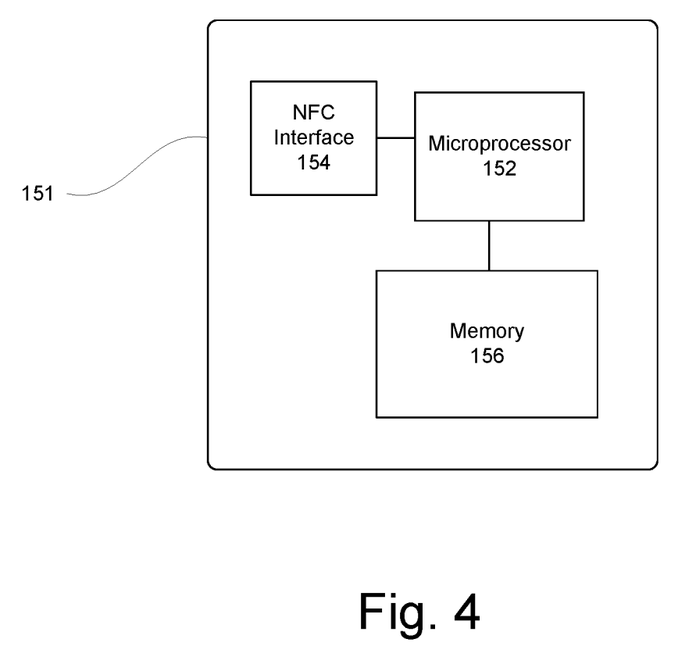
FIG. 4 is a block diagram of a transaction card microprocessor chip according to an embodiment of the invention.

The various components of the system 100 may, in particular, be configured for processing transactions involving the use of a transaction card such as the smart transaction card 150. The transaction card 150 may be any device having a processor configured for communicating via NFC and carrying out digital transactions and having a memory in which identification and encryption information can be stored. This may include chip-carrying transaction cards ("smart" cards), and mobile and non-mobile user computing devices. As illustrated in FIGS. 3 and 4, a typical transaction card 150 that is usable in various embodiments of the invention is a smart card with a microprocessor chip 151. The microprocessor chip 151 includes processing circuitry for storing and processing information, including a microprocessor 152 and a memory 156. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein. The memory 156 may be a read-only memory, write-once read-multiple memory or read/write memory, e.g., RAM, ROM, and EEPROM, and the chip 151 may include one or more of these memories. The memory 156 may be configured to store one or more software applications for execution by the microprocessor 152. Information associated with an account may also be stored in the memory 156. In particular, the memory 156 may have permanently stored therein a unique alphanumeric identifier and one or more public and private card encryption keys.

The microprocessor chip 151 further includes an NFC interface 154 configured for establishing communication with the user device 110 or other devices when the card 150 is within a predetermined NFC range. In some embodiments, the NFC interface 154 may comprise a radio frequency identification chip configured to communicate via NFC or other short-range protocols. In some embodiments, the microprocessor chip 151 may include circuitry configured for communication with the user device 110 via other means such as Bluetooth, satellite, Wi-Fi, wired communications, and/or any combination of wireless and wired connections.

In particular embodiments, the memory 156 of the chip 151 microprocessor chip 151 may have stored therein one or more applets with instructions for generating encrypted information and transmitting it to a receiving device (e.g., the user device 110) via the NFC interface 154. Such encrypted information may be or include an encrypted verification block or signature that may be used by the user device 110 or the processing server 120 to authenticate and verify the presence of the transaction card 150.

The memory 156 may, in particular, have an authentication application stored therein having instructions for the data processor 152 to establish an NFC communication session with a user communication device 110 and receive, via the NFC interface 154, a WRITE TAG command transmitted by the user communication device 110. The application may be configured to recognize the WRITE TAG command as an authentication challenge and, upon such recognition, to generate a challenge response based on challenge information included therein. The challenge response may include challenge response information that is unique to the transaction card. This may include, for example, a card identifier. The challenge response information may be or include information that is generated by the data processor 152 using information that is permanently or temporarily stored in the card memory 156. In particular embodiments, the authentication application is configured to cause the processor 152 to generate a digital signature that may be unique to the transaction card 150 and/or the NFC session. The digital signature and/or other challenge response information may be or include a cryptogam encrypted using challenge information received in the WRITE TAG command by the card data processing chip. The cryptogram may be created by the processor 152 using one or more of the public and private encryption keys stored in the memory 156. The challenge response information may also include a digital authentication certificate retrieved from the memory 156.

The authentication application may also be configured to receive a READ TAG command via NFC from the user communication device 110. In response, the application may transmit the challenge response via the NFC interface 154. In some embodiments, the authentication application may be configured so that the action of generating a digital signature and/or other challenge response information is not carried out unless or until a READ TAG command is received. In such embodiments, the actions of generating the challenge response information and transmitting the challenge response information may both be done in response to receiving the READ TAG command. In some embodiments, either or both of these actions may be conditioned on a time interval between the WRITE TAG command and the READ TAG command being less than a specified maximum time interval. If the maximum time interval is exceeded, the microprocessor 152 may transmit a "timed out" error message to the user communication device 110 via the NFC interface 154.

In some embodiments, the authentication application may be configured to terminate the authentication procedure if the NFC session with the user communication device 110 is ended prior to receiving the READ TAG command. In other embodiments, the application may allow or require termination of the initial NFC session after the WRITE TAG command is received and subsequent establishment of a second NFC session in which the READ TAG command is received. As before, transmission of the challenge response may be conditioned on the READ TAG command being received within a maximum time interval after the WRITE TAG command.

The user communication device 110 may be any computer device or communications device including a server, a network appliance, a personal computer (PC), a workstation, and a mobile interface device such as a smart phone, smart pad, handheld PC, or personal digital assistant (PDA). The user communication device 110 may also be a transaction terminal (e.g., a merchant or bank terminal) used for carrying out financial transactions and other interactions with an account holder. The user device 110 includes an on-board data processor 111 in communication with a memory module 113, a user interface 114, a network communication interface 112, and an NFC interface 116. The user device 110 may optionally include an image capturing device 115 (e.g., a digital camera). The data processor 111 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 114 of the device 110 includes a user input mechanism, which can be any device for entering information and instructions into the user device 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 112 is configured to establish and support wired or wireless data communication capability for connecting the device 110 to the network 105 or other communication network. The communication interface 112 can also be configured to support communication with a short-range wireless communication interface for communication via a short-range system such as Bluetooth.

The user device NFC interface 116 is configured for establishing near field communication with other NFC-enabled devices including, in particular, the data processing chip 151 of the transaction card 150. The NFC interface 116 is further configured for transmitting information to and receiving information transmitted by the data processing chip 151 via the chip NFC interface 154.

In embodiments of the invention, the memory 113 may have stored therein one or more applications usable by the data processor 111 to conduct and/or monitor transactions between the user device 110 and one or more processing servers 120 and authentication servers 130 over the network 105 and/or one or more merchant transaction terminals (not shown) via NFC, short-range communication, or the network 105. These applications may include instructions usable by the data processor 111 to identify transaction events, store event data in the memory 113, and communicate event data to the servers 120, 130. Some applications may also include instructions relating to receiving and interpreting instructions from the one or more processing servers 120 or the one or more authentication servers 130.

In particular embodiments, the memory 113 may include one or more applets configured for writing NDEF formatted information to NFC enabled tag devices (e.g., RFID tags) and/or for reading formatted information from such devices. These applets may include, in particular, instructions for executing a WRITE TAG command that causes formatted information to be transmitted to and stored in a memory of a receiving tag and instructions for executing a READ TAG command that causes formatted information to be transmitted by the tag and received by the user device 110. The memory 113 may also have stored therein a card communication application that can invoke the NDEF applets for use in a communication session with the transaction card 150. The card communication application may include instructions for the data processor 111 to establish a first NFC session with the transaction card 150 via the NFC interface 116 and then to transmit an NDEF WRITE TAG command to the transaction card 150 via the NFC interface 116. The application may also include instructions to assemble or receive session-specific challenge information that may be formatted for transmission via the NDEF WRITE TAG command. Such challenge information could include, for example, a session identifier or time stamp to differentiate the NFC session from other sessions. The challenge information may instead or in addition include information specific to an intended transaction card 150, the presence of which is required for completion of an authentication or authorization process. The challenge information may be generated by the data processor 111 using information received by the data processor 111 from a processing server 120 or authentication server 130 via the network communication interface 112 and/or information stored in the memory 113.

In some embodiments, the application may be configured to receive an authentication request from a transaction processing server 120 or authentication server 130. Such a request may, may be transmitted by the server in response to a request to carry out a transaction requiring verification of the presence of a particular transaction card 150 or otherwise requiring authentication of the transaction card 150 or the user. Such a request may include challenge information to be included in the WRITE TAG command. The application may be further configured to display information and instructions to the user of the user communication device 110 via the user interface 114. User instructions could include, for example, an instruction to initiate NFC communication with the transaction card 150.

The card communication application may further include instructions for the data processor 111 to transmit an NDEF READ TAG command to the transaction card 150 and to receive formatted response information from the transaction card 150 in return. The response information may include a card identifier and/or challenge response information constructed by the transaction card 150 using the challenge information. The application may also include instructions for the data processor 111 to use the challenge response information to authenticate the transaction card 150. This may be accomplished by direct comparison of the challenge response information to expected response information stored in the memory 113 or received from a requesting processing server 120 or authentication server 130.

In some embodiments, the action to authenticate the transaction card 150 may include transmitting the challenge response information to the authentication server 130 and receiving an authentication response back from the authentication server 130. In some embodiments, the challenge response information may be transmitted directly to the authentication server 130 via the network 105. In other embodiments, the user communication device 110 may transmit the challenge response information to the processing server 120 via the network 105 and the processing server 120, in turn, transmits the challenge response information to the authentication server 130.

In some embodiments, the challenge response information authentication may include information encrypted by the transaction card using card or account-associated encryption keys. In such embodiments, the card communication application may be configured to retrieve the required encryption key(s) from the memory 113 and to use them to decrypt the encrypted information. The application may condition authentication of the card 150 on successful decryption of the challenge response information.

The communication application may be configured to, upon establishing an authentication result, transmit the authentication result to the processing server 120, the authentication server 130, or other requesting system via the network 105.

The processing server 120 is a system of one or more network-enabled processing servers configured for processing transactions for an account associated with the transaction card 150. The processing server 120 is configured for selective communication with one or more user communication devices 110 (e.g., account holder mobile or other devices and merchant transaction terminals) via the network 105. The processing server 120 may be configured to store and retrieve account and transaction information in an account information database (not shown) and transaction card information in the card information database 140. The processing server 120 may receive transaction processing requests from any of the user devices 110 and is configured to use information from such requests to make determinations as to whether the requested transaction should be processed.

In some embodiments, the processing server 120 may require verification of the presence of an authorized transaction card 150 in order to process a transaction. In some such embodiments, the processing server may transmit a verification request to a user communication device 110 that is associated with the card 150 or its associated account. In other embodiments, the processing server 120 may transmit the request to a user communication device 110 (e.g., a merchant terminal) that is associated with the transaction to be processed. In either case, the verification request includes instructions for the user communication device 110 to establish an NFC communication session between the user communication device 110 and the transaction card 150 for verifying that the card 150 is in the possession of the account holder and/or in the presence of the transaction requester. In some embodiments, the verification is conducted by the user communication device 110 and the processing system 120 merely receives a response from the device 110 indicating a verification result. In some embodiments, however, the user communication device 110 may not conduct the verification and, instead, transmits to the processing server 120 challenge response information received from the transaction card 150. The processing server 120 may be configured to use the challenge response information to complete the authentication/verification of the transaction card 150. In some embodiments, however, the processing server 120 may forward the challenge response information to the authentication server 130 for completion of the authentication/verification process.

In some embodiments, the processing server 120 may generate challenge information that may be included in the verification request for submission by the user communication device 110 to the card 150. The challenge information may include card and/or transaction specific information. It may instead or in addition include an unpredictable challenge value such as a random or pseudo-random number.

The authentication server 130 may be a system of one or more network-enabled processing servers configured for selective communication with the user communication device 110 and/or the processing server 120 via the network 105. The authentication processor 130 may also be able to access the card information database 140 via the network 105 either directly or through the processing server 120. The authentication server 130 may be configured for transmitting card authentication requests to and receiving authentication responses from the user communication device 110. The authentication server 130 may be configured to generate challenge information for inclusion in an authentication request. Such challenge information may be or include card-specific information obtained from the card database 140. The challenge information may also or instead include one-time request or transaction-specific information to be used by the transaction card 150 to generate challenge response information. The authentication server 130 may be further configured to receive an authentication request response from the user communication device 110, the response including challenge response information generated by the transaction card 150. The authentication server 130 may be configured to use the challenge response information to verify that such information was generated by the expected transaction card 150.

The card database 140 may have stored therein one or more data records associated with the transaction card 150. In some embodiments, these records may include one or more private encryption keys assigned to the transaction card 150 and stored in the card memory 156. The one or more encryption keys may be accessed by the processing server 120 or the authentication server 130 as needed for decryption of card-encrypted information included in the challenge response information. The processing server 120 and/or the authentication server 130 may be configured for using the decryption keys and one or more public keys associated with the transaction card to decrypt the card-encrypted information to verify that the challenge response information was provided by the expected transaction card 150. In some embodiments, a public encryption key may be part of or included with the challenge response information.

The present invention provides a significant improvement in transaction security by providing enhanced security to the process of assuring the presence of an authenticated transaction card. By using session-specific information in combination with card-specific information to authenticate the presence of a particular account-associated card, the invention makes it difficult or impossible for an intercepting entity to use the information in a replay attack. The methods may be further enhanced by having the card itself encrypt session-specific information using private encryption keys available only from the card and a limited access card database.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method of communicating with a transaction card having a card data processor, a near field communication (NFC) interface, and a card memory having a unique card identifier stored therein, the method comprising:

establishing, by a user communication device, a first NFC session with the transaction card, wherein the transaction card comprises a microprocessor chip further comprising an NFC interface configured to communicated with the user communication device;

transmitting, by the user communication device to the transaction card, a WRITE TAG command including session-specific challenge information;

transmitting, by the user communication device to the transaction card, a READ TAG command, wherein the READ TAG command is transmitted within a maximum time interval from transmission of the WRITE TAG or after the maximum time interval from transmission of the WRITE TAG command;

receiving, by the user communication device from the transaction card responsive to the transmission of the READ TAG command within the maximum time interval, the unique card identifier and card-specific challenge response information comprising a digital signature generated from the session-specific challenge information;

receiving, by the user communication device from the transaction card responsive to the transmission of the READ TAG command after the maximum time interval, an error message; and authenticating, by the user communication device after receipt of the card-specific challenge response information, the transaction card using the card-specific challenge response information.

2. The method according to claim 1, wherein the card-specific challenge response information comprises card-encrypted information.

3. The method according to claim 2, wherein the action of authenticating the transaction card includes:
attempting to decrypt the card-encrypted information using at least one card-unique key associated with the unique card identifier; and
responsive to a successful decryption of the card-encrypted information, establishing a positive authentication result.

4. The method according to claim 2, wherein the card-specific challenge response information further comprises a digital authentication certificate.

5. The method according to claim 1, wherein the session-specific challenge information is or includes a random or pseudo-random number generated for the session.

6. The method according to claim 1, wherein the session-specific challenge information is generated by and the action of authenticating is carried out by the user communication device.

7. The method according to claim 1, further comprising receiving the session-specific challenge information by the user communication device from an authentication server.

8. The method according to claim 7, wherein the action of authenticating the transaction card comprises:
transmitting the challenge response information to the authentication server; and
receiving an authentication result from the authentication server.

9. The method according to claim 1, further comprising, prior to the action of transmitting the READ TAG command:
terminating, by the user communication device, the first NFC session; and
establishing, by the user communication device within a predetermined time interval after termination of the first NFC session, a second NFC session with the transaction card.

10. A user communication device, comprising:
a communication device data processor;
a near field communication (NFC) interface in communication with the data processor and configured for communication with one or more transaction cards, wherein each transaction card comprises a microprocessor chip further comprising a transaction card NFC interface configured to communicated with the user communication device; and
a communication device memory accessible by the data processor and containing a communication application with instructions to be carried out by the data processor, the communication application being configured to:
establish a first NFC session with a transaction card,
transmit, to the transaction card, a WRITE TAG command including session-specific challenge information,
transmit, to the transaction card, a READ TAG command, wherein the READ TAG command is transmitted within a maximum time interval or after the maximum time interval from transmission of the WRITE TAG command,
receive, from the transaction card responsive to the transmission of the READ TAG command within a maximum time interval, a unique card identifier and, card-specific challenge response information comprising a digital signature generated by the transaction card from the session-specific challenge information,
receive, from the transaction card responsive to the transmission of the READ TAG command after the maximum time interval, an error message, and
authenticate, after receipt of the challenge response information, the transaction card using the card-specific challenge response information.

11. The user communication device according to claim 10, wherein the card-specific challenge response information comprises card-encrypted information and the communication application is configured to, as part of the action to authenticate:
attempt to decrypt the card-encrypted information using at least one card-unique key associated with the transaction card, and
responsive to a successful decryption of the card-encrypted information, establish a positive authentication result.

12. The user communication device according to claim 10, wherein the communication application is further configured to generate a random or pseudo-random number for inclusion in the session-specific challenge information.

13. The user communication device according to claim 10, further comprising:
a network communication interface in communication with the communication device data processor and configured for selective communication with an authentication server via a network,
wherein the communication application is further configured to receive the session-specific challenge information from the authentication server.

14. The user communication device according to claim 13, wherein the communication application is further configured to, as part of the action to authenticate:
transmit the challenge response information to the authentication server; and
receive an authentication result from the authentication server.

15. The user communication device according to claim 10, wherein the communication application is further configured to
determine a time interval between the action of transmitting the READ TAG command and receiving the card-specific challenge response information, and
carry out the action of authenticating the transaction card only if the time interval is less than a predetermined maximum communication interval.

16. The user communication device according to claim 10, wherein the communication application is further configured to, prior to the action to transmit the READ TAG command:
terminate the first NFC session; and
establish a second NFC session with the transaction card.

17. The user communication device according to claim 16, wherein the action to establish the second NFC session is taken within a predetermined time interval after the action to terminate the first NFC session.

18. A transaction card, comprising:
a card microprocessor;
a near field communication (NFC) interface;
and a card memory having a card identifier, at least one card-unique encryption key, and one or more applets stored therein, the one or more applets including instructions for the card microprocessor to:
receive, from a user communication device via the NFC interface, a WRITE TAG command including session-specific challenge information, generate a digital signature using the session-specific challenge information, wherein the digital signature is or includes a cryptogram encrypted using at least a portion of the challenge information and the at least one card-unique encryption key, receive, from the user communication device via the NFC interface, a READ TAG command, wherein the READ TAG command is received within a maximum time interval from the transmission of the WRITE TAG command or after the maximum time interval from the WRITE TAG command, transmit, to the user communication device responsive to receiving the READ TAG command within the maximum time interval, the digital signature, and transmit, to the user communication device responsive to receiving the READ TAG command after the maximum time interval, an error message.

19. The transaction card according to claim 18, wherein the card memory has at least one public key certificate stored therein and the one or more applets include instructions for the card microprocessor to transmit the at least one public key certificate with the card identifier and the digital signature.

20. The transaction card according to claim 18, wherein the card-unique encryption key is associated with an account associated with the transaction card.

* * * * *